United States Patent
Takenoiri et al.

(10) Patent No.: US 7,993,764 B2
(45) Date of Patent: Aug. 9, 2011

(54) PERPENDICULAR MAGNETIC RECORDING MEDIUM AND THE METHOD OF MANUFACTURING THE SAME

(75) Inventors: Shunji Takenoiri, Nagano (JP); Yasushi Sakai, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 760 days.

(21) Appl. No.: 11/255,579

(22) Filed: Oct. 21, 2005

(65) Prior Publication Data

US 2006/0093867 A1   May 4, 2006

(30) Foreign Application Priority Data

Oct. 21, 2004   (JP) ................................ 2004-306277

(51) Int. Cl.
G11B 5/66   (2006.01)
(52) U.S. Cl. ...................... 428/827; 428/831.2; 427/131
(58) Field of Classification Search .......... 428/827–829, 428/831.2; 427/128–131
See application file for complete search history.

(56) References Cited

U.S. PATENT DOCUMENTS

| | | | |
|---|---|---|---|
| 6,171,693 B1 * | 1/2001 | Lubitz et al. | 428/332 |
| 6,753,072 B1 * | 6/2004 | Chen et al. | 428/828 |
| 6,791,796 B2 * | 9/2004 | Shukh et al. | 360/125.12 |
| 6,858,320 B2 * | 2/2005 | Takenoiri et al. | 428/611 |
| 2002/0182446 A1 | 12/2002 | Takenoiri et al. | |
| 2005/0008902 A1 * | 1/2005 | Bertero et al. | 428/694 TM |
| 2005/0014029 A1 * | 1/2005 | Takenoiri et al. | 428/694 T |
| 2005/0098426 A1 * | 5/2005 | Ranjan et al. | 204/192.2 |

FOREIGN PATENT DOCUMENTS

| | | |
|---|---|---|
| JP | 2002-100030 A | 4/2002 |
| JP | 2002-298323 A | 10/2002 |
| JP | 2003-178412 A | 6/2003 |
| JP | 2003-228809 A | 8/2003 |
| JP | 2003-228815 A | 8/2003 |
| WO | 2004-061829 A | 7/2004 |
| WO | 2004061829 A1 | 7/2004 |

OTHER PUBLICATIONS

Takenoiri et al.; "Development and problems in CoPtCr-SiO2 perpendicular media"; Preprints for 135th Study Meeting, Magnetic Society of Japan, Mar. 2004; pp. 9-16, English Abstract.

(Continued)

*Primary Examiner* — Holly Rickman
*Assistant Examiner* — Linda Chau
(74) *Attorney, Agent, or Firm* — Rossi, Kimms & McDowell LLP

(57) ABSTRACT

A perpendicular magnetic recording medium includes a soft magnetic backing layer, an underlayer, a nonmagnetic intermediate layer, and a magnetic recording layer sequentially deposited on a nonmagnetic substrate. The underlayer can contain cobalt, nickel, and iron and have an fcc structure and exhibit soft magnetic property. The underlayer preferably contains nickel in a range of 30 to 88 at % and iron in a range of 0.1 to 22 at %. The underlayer can further contain Si, B, Nb, N, Ta, Al, Pd, Cr, or Mo. The nonmagnetic intermediate layer preferably contains at least one element selected from Ru, Re, Pd, Ir, Pt, and Rh. The magnetic recording layer preferably has a granular structure. A seed layer can be further provided between the soft magnetic backing layer and the underlayer.

9 Claims, 1 Drawing Sheet

OTHER PUBLICATIONS

Substantive Examination Adverse Report issued in Malaysian application No. PI 20054932, dated May 22, 2009.

Substantive/Modified Substantive Examination Adverse Report issued in corresponding Malaysian application No. PI 20054932, dated May 22, 2009.

Second Office Action issued in corresponding Chinese application No. 200510116221.6, dated Apr. 10, 2009. Partial translation provided.

Notification of Reasons for Refusal issued in corresponding Japanese application No. 2004-306277, dated Jun. 9, 2009.

Third Office Action issued in corresponding Chinese Patent Application No. 200510116221.6 dated Jun. 25, 2010. Japanese translation of Chinese Action provided. English translation of Japanese translation provided.

\* cited by examiner

PERPENDICULAR MAGNETIC RECORDING MEDIUM AND THE METHOD OF MANUFACTURING THE SAME

This application is based on, and claims priority to, Japanese Application No. 2004-306277, filed on Oct. 21, 2004, the entire content of which is incorporated herein by reference.

BACKGROUND

As a result of rapid increase in recording density in an HDD, the conventionally employed in-plane magnetic recording system is facing severe difficulties in overcoming the problem of "thermal fluctuation". The thermal fluctuation is a phenomenon in which the recorded signals cannot be stably held, and in the in-plane magnetic recording system, tends to increase in association with the increase in recording density. A perpendicular magnetic recording system on the other hand has, in contrast to the in-plane magnetic recording system, a characteristic where the stability of bits enhances with the increase of the recording density. Thus, development of a perpendicular magnetic recording system is being actively pursued.

A perpendicular magnetic recording medium is mainly composed of a magnetic recording layer of a hard magnetic material, an underlayer for aligning the magnetic recording layer in an aimed orientation, a protective layer for protecting the surface of the magnetic recording layer, and a soft magnetic layers including a soft magnetic backing layer that serves a function to concentrate the magnetic flux generated by a magnetic head for recording in the recording layer. Because direct contact between the magnetic recording layer and the soft magnetic backing layer is known to generate noise due to the interaction between the two layers, a nonmagnetic layer is preferably disposed between the magnetic recording layer and the soft magnetic backing layer.

One of the basic characteristics of a magnetic recording medium is a signal-to-noise ratio (SNR). To improve the SNR, the output from the magnetic recording medium needs to be increased and the noise needs to be decreased. One of the reasons for the decrease in output and the increase in noise is degradation in the variance of alignment (variation of crystal orientation) in the magnetic recording layer. In a perpendicular magnetic recording medium, the axis of easy magnetization of the magnetic recording layer needs to be aligned perpendicularly to the medium surface. If the variance of alignment of the axis of easy magnetization increases, the magnetic flux in the perpendicular direction decreases and the output signal lowers. The present inventors' studies further revealed that a medium with a large variance of alignment deteriorates magnetic isolation between the magnetic crystal grains composing the magnetic recording layer and the swelling of the magnetic cluster size, increasing media noise. See *Development and problems in CoPtCr—SiO$_2$ perpendicular media* (Japanese) by Shunji Takenoiri, et al., Preprints for 135th Study Meeting, Magnetic Society of Japan, March 2004, pp. 9-16, for example. Therefore, the variance of alignment in the magnetic recording layer must be as small as possible to enhance output and reduce noise in a perpendicular magnetic recording medium.

In addition to the above-described requirements, the size of magnetic crystal grains in the magnetic recording layer must be reduced for noise reduction in a perpendicular magnetic recording medium. Large magnetic crystal grains make the transition region of the recording bits zigzag shaped, increasing the transition noise. Consequently, to reduce transition noise, the size of the magnetic crystal grains needs to be reduced and the shape of the transition region of the recording bits needs to be made as straight as possible.

Thus, to enhance the performance of a perpendicular magnetic recording medium, both the alignment variance of the magnetic recording layer and the size of the magnetic crystal grains need to be reduced. It is also known that the underlayer plays an important role in controlling magnetic properties, alignment, and crystallinity of a magnetic recording layer. It is well known that when a magnetic recording layer epitaxially grows with respect to an underlayer, for example, the size of the magnetic crystal grains follows the size of the crystal grains in the underlayer. Therefore, it is essential to reduce the size of crystal grains in the underlayer to reduce the size of crystal grains in the magnetic recording layer.

A single layer of titanium or a titanium alloy such as TiCr was once proposed for an underlayer of a perpendicular magnetic recording medium. Although the use of a titanium alloy can reduce the size of the crystal grains in the magnetic recording layer, other problems arise, such as a large variance of alignment and the generation of an initial growth layer with disordered crystallinity at an initial growth stage of the magnetic recording layer. Thus, materials for the underlayer that can replace the titanium alloy are being contemplated.

For the underlayers in the above-mentioned state of the art, the proposals have been disclosed including using a double-layer underlayer consisting of a ruthenium layer and a layer of an iron alloy, chromium, or a cobalt alloy (see for example Japanese Unexamined Patent Application Publication No. 2002-100030), and using a ruthenium underlayer and a soft magnetic backing layer of a CoFe alloy (see for example Japanese Unexamined Patent Application Publication No. 2002-298323). The above proposals can improve magnetic properties and the electromagnetic conversion performance by reducing noise due to the soft magnetic layer. Another proposal included a lamination of a first underlayer of CoPd, CoAl, or Ni$_3$Al and a second underlayer of Ru, Mo, or Pt, to improve the recording performance of a perpendicular magnetic recording medium (see for example Japanese Unexamined Patent Application Publication No. 2003-228815).

The above proposals can provide good crystallinity and crystal isolation, and favorable magnetic performance with a thick underlayer of at least 30 nm. Nonetheless, if the underlayer is made thinner, the magnetic performance tends to degrade noticeably. With the requirement for higher recording density, the underlayer needs to be as thin as possible. To reduce the transition noise and enhance the recording density of a perpendicular magnetic recording medium, it is required to ensure sharp recording magnetic field, to make the transition of a recording bit as straight as possible, and to form a recording bit with a minimal size. This needs a minimum distance between the soft magnetic backing layer and the magnetic head. Thus, it is important to reduce the thickness of a nonmagnetic layer disposed between the soft magnetic backing layer and the magnetic recording layer in addition to reducing the thickness of a protective layer and the flying height of the magnetic head.

Merely reducing the thickness of an underlayer degrades crystal alignment of the magnetic recording layer and deteriorates magnetic isolation between the magnetic crystal grains, worsening magnetic performances. There still remains a need for further improving the performance of a perpendicular magnetic recording medium. The present invention addresses this need.

SUMMARY OF THE INVENTION

The present invention relates to a perpendicular magnetic recording medium and method of manufacturing the same, in particular, to a perpendicular magnetic recording medium installed in a hard disk drive (HDD) used for an external storage device of a computer, AV equipment, etc.

One aspect of the present invention is a perpendicular magnetic recording medium. The medium can include a soft magnetic backing layer, an underlayer, a nonmagnetic intermediate layer, and a magnetic recording layer sequentially laminated on a nonmagnetic substrate. The underlayer can comprise cobalt, nickel, and iron, have an fcc structure, and exhibit soft magnetic property.

For the underlayer to have an fcc structure and soft magnetic property, the underlayer can contain nickel in a range of 30 at % to 88 at % and iron in a range of 0.1 at % to 22 at %. The underlayer can further contain at least one element selected from a group consisting of Si, B, Nb, N, Ta, Al, Pd, Cr, and Mo. The underlayer can have a thickness of at most 30 nm and the nonmagnetic intermediate layer can have a thickness of at most 20 nm. The underlayer can exhibit a coercivity of at most 10 kA/m.

The nonmagnetic intermediate layer can contain at least one element selected from a group consisting of Ru, Re, Pd, Ir, Pt, and Rh.

A seed layer can be included between the soft magnetic backing layer and the underlayer to improve crystallinity of the underlayer. The seed layer can contain at least one element selected from a group consisting of Ta, Ti, Zr, Cr, Mo, W, Si, Al, Pd, and Pt. The seed layer can have a thickness of at most 5 nm.

The magnetic recording layer can have a granular structure in which the magnetic crystal grains are dispersed in a matrix of nonmagnetic oxide or nonmagnetic nitride.

Another aspect of the present invention is a method of manufacturing the perpendicular magnetic recording medium described above. The method includes providing the nonmagnetic substrate, and sequentially depositing the soft magnetic backing layer, the underlayer, the nonmagnetic intermediate layer, and the magnetic recording layer on one side of the nonmagnetic substrate.

The soft magnetic backing layer, the underlayer, the nonmagnetic intermediate layer, and the magnetic recording layer can be deposited without heating.

DETAILED DESCRIPTION

Figure 1:
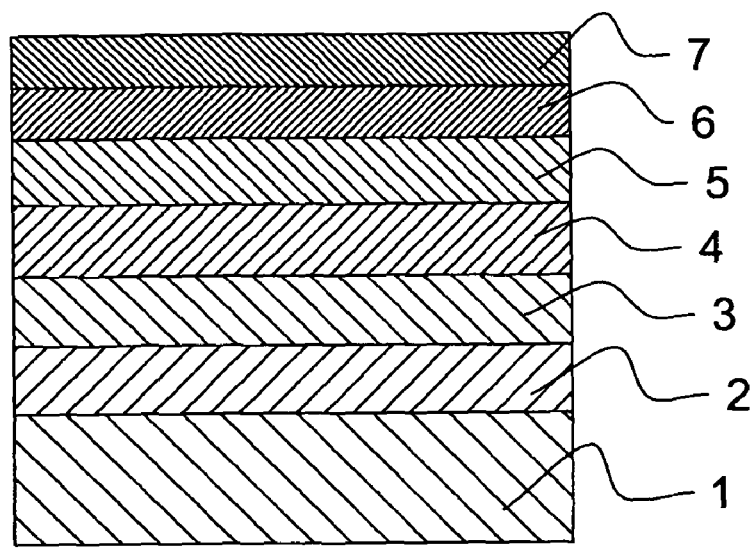
FIG. 1 schematically illustrates a cross-sectional view of an embodiment of a perpendicular magnetic recording medium according to the present invention.
Figure 2:
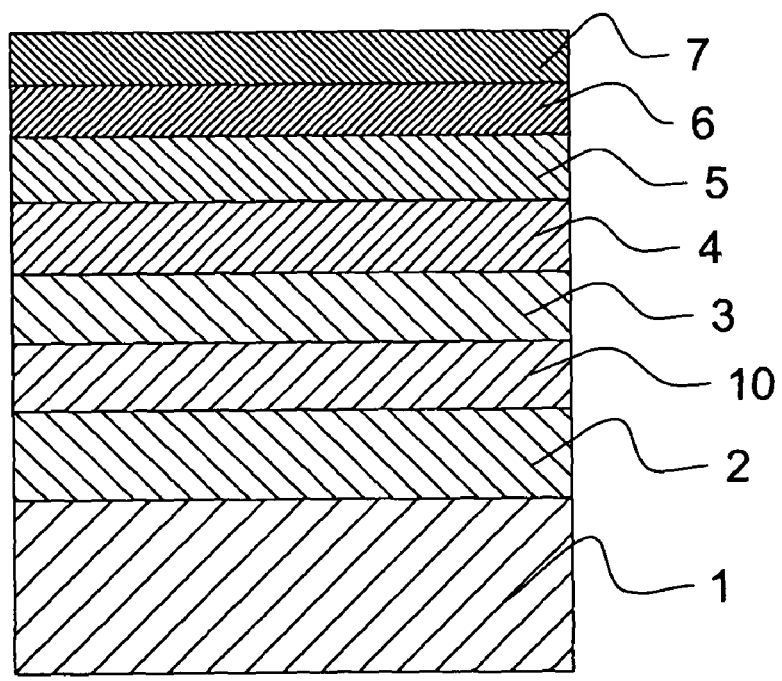
FIG. 2 is similar to the embodiment of FIG. 1, but includes a seed layer.

Referring to FIGS. 1 and 2, a perpendicular magnetic recording medium comprises a nonmagnetic substrate 1, a soft magnetic backing layer 2, a soft magnetic underlayer 3, a nonmagnetic intermediate layer 4, a magnetic recording layer 5, a protective layer 6, and a liquid lubricant layer 7. A seed layer 10 can be provided between the soft magnetic backing layer 2 and the underlayer 3 as illustrated in FIG. 2.

The nonmagnetic substrate 1 can be composed of any of variety substrates that are commonly used in magnetic recording media, such as NiP-plated aluminum alloy, strengthened glass, crystallized glass, resin, etc.

The soft magnetic backing layer 2 can be composed of a crystalline alloy such as FeTaC or Sendust alloy (FeSiAl), or an amorphous cobalt alloy, such as CoZrNb or CoTaZr. The optimal thickness of the soft magnetic backing layer 2 depends on the structure and characteristics of the magnetic head used for recording, and is preferably in the range of 10 nm to 500 nm, considering the balance with productivity.

The seed layer 10, when provided on the soft magnetic backing layer, can be composed of a material selected from Ta, Ti, Zr, Cr, Mo, W, Si, Al, Pd, Pt, and an alloy mainly composed of at least one element selected from these elements. The seed layer has the effect of decreasing the size of crystal grains and improving the crystal alignment of the underlayer 3. Since the material of the seed layer is nonmagnetic, the thickness of the seed layer is preferably as thin as possible to effectively concentrate the magnetic field generated by the recording head into the soft magnetic backing layer. The thickness of the seed layer is at most 5 nm, preferably not larger than 3 nm.

The underlayer 3 having soft magnetic property is composed of a soft magnetic material containing cobalt, nickel and iron, and having an fcc structure. Such a material allows the fcc (111) crystal plane to preferentially align in parallel to the substrate surface, to form an underlayer with excellent crystallinity. By adding to the underlayer 3 at least one element selected from Si, B, Nb, N, Ta, Al, Pd, Cr, and Mo, the underlayer can improve the soft magnetic performance and miniaturization of the crystal grains. The miniaturization of the crystal grains in the underlayer decreases the size of crystal grains in the magnetic recording layer. Since the underlayer functions similarly to the soft magnetic backing layer, considering the distance between the magnetic head and the layer having the soft magnetic property alone, a thick underlayer layer raises no functional problem in particular. A thick underlayer, however, is liable to increase the crystal grain size. Thus, considering decreasing the crystal grain size of the magnetic recording layer, the thickness of the underlayer layer is preferably at most 30 nm, more preferably in the range of 3 nm to 15 nm. The coercivity of the underlayer 3 is at most 10 kA/m, because coercivity beyond 10 kA/m makes it difficult for the underlayer to function as a layer exhibiting soft magnetic property. More preferably, the coercivity is not larger than 1.5 kA/m.

The nonmagnetic intermediate layer 4 preferably consists of a material selected from Ru, Re, Pd, Ir, Pt, and Rh, or an alloy mainly composed of a material selected from Ru, Re, Pd, Ir, Pt, and Rh. To achieve high recording density, the thickness of the nonmagnetic intermediate layer needs to be as thin as possible to the extent to avoid deteriorating the magnetic performance and the electromagnetic conversion performance of a magnetic recording layer. The thickness of the nonmagnetic intermediate layer is preferably at most 20 nm, more preferably in the range of 1 nm to 20 nm.

The underlayer and the nonmagnetic intermediate layer as described above achieve favorable alignment and crystallinity even through a deposition process without heating. A granular magnetic recording layer having a matrix of nonmagnetic oxide or nonmagnetic nitride exhibits excellent characteristics including low noise and high thermal stability. Note that, because these layers are deposited without heating, conventional granular magnetic recording layers had difficulty in reducing the thickness of the intermediate layer and in obtaining high alignment and crystallinity of the magnetic recording layer. Here, employment of the underlayer and the nonmagnetic intermediate layer as described above provides a good granular magnetic recording layer.

The magnetic recording layer 5 is preferably composed of a ferromagnetic alloy material containing at least cobalt and platinum. The c-axis of a hexagonal close packed structure (hcp) of the material needs to align perpendicularly to the film surface to use the material in a perpendicular magnetic recording medium. The material for the magnetic recording layer 5 can be selected from alloys such as CoPt, CoCrPt, CoCrPtB, and CoCrPtTa, multilayer lamination films such as [Co/Pt]$_n$ and [Co/Pd]$_n$, and granular materials such as CoPt—SiO$_2$, CoCrPtO, CoCrPt—SiO$_2$, CoCrPt—Al2O$_3$, CoPt—AlN, CoCrPt—Si$_3$N$_4$. The thickness of the magnetic recording layer 5 is preferably at most 30 nm in view of productivity and high-density recording, more preferably not larger than 15 nm.

The protective layer 6 can be composed of a variety of thin film materials commonly used for a protective layer of magnetic recording media. For example, a thin film mainly composed of carbon can be used. The liquid lubricant layer 7 can be composed of a variety of lubricant material commonly used for a liquid lubricant material of magnetic recording media. For example, a perfluoropolyether lubricant can be used.

The layers laminated on a nonmagnetic substrate can be formed by means of a variety of deposition techniques commonly employed in the field of magnetic recording media. Formation of the layers, except for the liquid lubricant layer, can be carried out by a DC magnetron sputtering method, an RF magnetron sputtering method, or a vacuum evaporation method, for example. Formation of the liquid lubricant layer can be carried out by a dipping method or a spin coating method, for example.

Specific embodiments of a perpendicular magnetic recording medium according to the present invention will be described in detail below. The present invention is, of course, should not be limited to the examples provided, but can be modified in various ways within the spirit and scope of the invention.

In Example 1 (E1), a chemically strengthened glass substrate with a smooth surface (N-5 glass substrate manufactured by HOYA Corporation) was used as a nonmagnetic substrate 1. After cleaning, the substrate was introduced into a sputtering apparatus and a CoZrNb amorphous soft magnetic backing layer 2 having a thickness of 160 nm was deposited using a target of Co3Zr5Nb. Here, the numerals 3 and 5 represent 3 at % of Zr, and 5 at % of Nb, respectively, and the remainder being Co. The notation is applicable in the following description. Then, a CoNiFe underlayer 3 having a thickness of 6 nm was deposited using a target of Co35Ni4Fe. Subsequently, a ruthenium intermediate layer 4 having a thickness of 10 nm was deposited using a ruthenium target under an argon gas pressure of 4.0 Pa. Subsequently, a magnetic recording layer 5 of CoCrPt—SiO$_2$ having a thickness of 10 nm was deposited using a target of 90 mol % (Co12Cr14Pt)–10 mol % (SiO$_2$) under a gas pressure of 5.3 Pa. Finally, a protective layer 6 of carbon having a thickness of 7 nm was deposited using a carbon target, and the substrate having these layers deposited thereon was taken out from the vacuum chamber. The deposition processes of these layers, other than the intermediate layer of ruthenium and the magnetic recording layer of CoCrPt—SiO$_2$, were conducted under an argon gas pressure of 0.67 Pa. Deposition of the magnetic recording layer of CoCrPt—SiO$_2$ was carried out by an RF magnetron sputtering method and other layers were formed by a DC magnetron sputtering method. After that, a liquid lubricant layer 7 of perfluoropolyether was formed to a thickness of 2 nm by a dipping method to form a perpendicular magnetic recording medium. For evaluating the magnetic characteristics of the underlayer, a sample was prepared by depositing CoNiFe underlayer alone having a thickness of 100 nm on the glass substrate.

In Example 2 (E2), a perpendicular magnetic recording medium was manufactured in the same manner as in Example 1, except that an underlayer of CoNiFeSi of 6 nm thick was deposited using a target of Co35Ni4Fe2Si. For evaluating the magnetic characteristics of the underlayer, a sample was prepared by depositing the CoNiFeSi underlayer alone having a thickness of 100 nm on the glass substrate.

In Example 3 (E3), a perpendicular magnetic recording medium was manufactured in the same manner as in Example 1, except that the underlayer of CoNiFeB of 6 nm thick was deposited using a target of Co35Ni4Fe4B. For evaluating the magnetic characteristics of the underlayer, a sample was prepared by depositing the CoNiFeB underlayer alone having a thickness of 100 nm on the glass substrate.

In Example 4 (E4), a perpendicular magnetic recording medium was manufactured in the same manner as in Example 1, except that the underlayer of CoNiFeNbB of 6 nm thick was deposited using a target of Co35Ni4Fe3Nb1B. For evaluating the magnetic characteristics of the underlayer, a sample was prepared by depositing the CoNiFeNbB underlayer alone having a thickness of 100 nm on the glass substrate.

In Example 5, a perpendicular magnetic recording medium was manufactured in the same manner as in Example 1, except that a seed layer of tantalum 0.5 nm thick was deposited using a target of tantalum under an argon gas pressure of 0.67 Pa by means of DC magnetron sputtering after the deposition of the soft magnetic backing layer. For evaluating the magnetic characteristics of the underlayer, a sample was prepared by depositing a seed layer of tantalum 0.5 nm thick on the glass substrate and then an underlayer of CoNiFe of 100 nm thick.

In Example 6, a perpendicular magnetic recording medium was manufactured in the same manner as in Example 1, except that a soft magnetic backing layer of FeCoB of 100 nm thick was deposited using a target of Fe27Co6B and then a seed layer of tantalum 0.5 nm thick was deposited using a target of tantalum. The soft magnetic backing layer of FeCoB and the seed layer of tantalum were deposited by DC magnetron sputtering under an argon gas pressure of 0.67 Pa.

In Comparative Example 1 (CE1), a perpendicular magnetic recording medium was manufactured in the same manner as in Example 1, except that the underlayer of CoNiFe was not deposited and the thickness of the intermediate layer of ruthenium was 35 nm.

In Comparative Example 2 (CE2), a perpendicular magnetic recording medium was manufactured in the same manner as in Example 1, except that the underlayer of CoNiFe was not deposited and the thickness of the intermediate layer of ruthenium was 15 nm.

In Comparative Example 3 (CE3), a perpendicular magnetic recording medium was manufactured in the same manner as in Example 1, except that an underlayer of CoNiFe of 6 nm thick was deposited using a target of Co13Ni25Fe. For evaluating the magnetic characteristics of the underlayer, a sample was prepared by depositing the CoNiFe underlayer alone having a thickness of 100 nm on the glass substrate.

In Comparative Example 4 (CE4), a perpendicular magnetic recording medium was manufactured in the same manner as in Example 1, except that an underlayer of CoNiFeC of 6 nm thick was deposited using a target of Co35Ni4Fe8C. For evaluating the magnetic characteristics of the underlayer, a sample was prepared by depositing the CoNiFeC underlayer alone having a thickness of 100 nm on the glass substrate.

In Comparative Example (CE5), a perpendicular magnetic recording medium was manufactured in the same manner as in Example 1, except that an underlayer of CoFe of 6 nm thick was deposited using a target of Co4Fe. For evaluating the structure of an underlayer, a sample was prepared by depositing the CoFe underlayer alone having a thickness of 100 nm on the glass substrate.

Measurements and comparison were made on the thus obtained perpendicular magnetic recording media. The measurements include coercivity Hc and squareness ratio S using a Kerr effect measuring apparatus, and media noise and SNR using a read-write tester. A phrase "R/W performance" is used for describing the media noise and the SNR combination. The grain size of crystal grains in the magnetic recording layer was evaluated from an image taken by a transmission electron microscope (TEM). In the characteristics of the underlayer, the Hc was evaluated by a vibrating sample magnetometer (VSM), and the crystal structure was evaluated by an X-ray diffraction (XRD) apparatus.

Table 1 below shows the Hc, S, SNR at 336 kfci, and the normalized noise measured on the perpendicular magnetic recording media of Examples 1-6 and Comparative Examples 1-5. The Hc and the crystal structure of the underlayers are also shown.

Since it is well known that the squareness ratio S well correlates with thermal stability of a perpendicular magnetic recording medium, the perpendicular magnetic recording medium of Example 1, exhibiting a squareness ratio S of 1.0, has been found to have no problem in thermal stability. The grain size of the crystal grains in the magnetic recording layer evaluated by the TEM was 6.7 nm in the perpendicular magnetic recording medium of Example 1, while about 9 nm in a perpendicular magnetic recording medium of Comparative Examples 1 and 2. The XRD measurements were made on a rocking curve of a Co (002) peak, which indicates c-axis alignment of a magnetic recording layer. The measured half width of the rocking curve was 3.4° for the perpendicular magnetic recording medium of Example 1, while 7.6° and 8.2° for the perpendicular magnetic recording media of Comparative Examples 1 and 2, respectively.

These results have demonstrated that the provision of the underlayer improves the crystal alignment in the magnetic recording layer as well as minimizing the crystal grain size. The reduction of media noise and the enhancement of the

TABLE 1

| | Underlayer | | | Intermediate Seed Layer | | Characteristics of Perpendicular Magnetic Recording Medium | | | |
|---|---|---|---|---|---|---|---|---|---|
| Examples | Material | Crystal Structure | Hc (kA/m) | Layer Material | Thickness (nm) | Hc (kA/m) | S | SNR (dB) | Normalized Noise (μVrms/mVpp) |
| E1 | Co35Ni4Fe | fcc | 1.19 | — | 10 | 446 | 1.00 | 20.8 | 20.1 |
| E2 | Co35Ni4Fe2Si | fcc | 0.48 | — | 10 | 470 | 0.99 | 21.3 | 17.6 |
| E3 | Co35Ni4Fe4B | fcc | 0.40 | — | 10 | 462 | 0.99 | 21.3 | 17.7 |
| E4 | Co35Ni4Fe3Nb1B | fcc | 0.32 | — | 10 | 470 | 0.99 | 21.5 | 17.5 |
| E5 | Co35Ni4Fe | fcc | 0.48 | Ta | 10 | 494 | 1.00 | 21.7 | 17.2 |
| E6 | Co35Ni4Fe | fcc | 0.48 | Ta | 10 | 489 | 1.00 | 21.6 | 17.2 |
| CE1 | — | — | — | — | 35 | 414 | 0.92 | 18.8 | 34.2 |
| CE2 | — | — | — | — | 15 | 207 | 0.99 | 10.6 | 55.9 |
| CE3 | Co13Ni25Fe | mainly bcc | 0.48 | — | 10 | 279 | 0.75 | 11.7 | 51.9 |
| CE4 | Co35Ni4Fe8C | fcc | 17.51 | — | 10 | 379 | 0.91 | 18.1 | 30.6 |
| CE5 | Co4Fe | mainly fcc | — | — | 10 | 236 | 0.89 | 13.6 | 47.9 |

First, comparison and consideration are made between Example 1 and Comparative Examples 1 and 2. Comparative Examples 1 and 2 are conventional perpendicular magnetic recording medium without an underlayer exhibiting soft magnetic property. While Comparative Example 1 has a ruthenium intermediate layer having a thickness of 35 nm, the thickness of the ruthenium intermediate layer in Comparative Example 2 is reduced to 15 nm. As is apparent from the Table 1, if the underlayer is not provided, reducing the ruthenium film thickness to 15 nm decreased the Hc to a half and decreased the SNR by a significant amount of 8 dB. As this example shows, reducing the thickness of a ruthenium intermediate layer was difficult in a conventional perpendicular magnetic recording medium without employing the soft magnetic underlayer. In contrast, a perpendicular magnetic recording medium of Example 1, which is provided with a soft magnetic underlayer of CoNiFe, although the thickness of the ruthenium intermediate layer is a small value of 10 nm, resulted in the increase in Hc by about 8% and SNR by 2 dB, and noticeable reduction of media noise, as compared with a perpendicular magnetic recording medium of Comparative Example 1. Thus, it has been demonstrated that the use of a soft magnetic underlayer of CoNiFe improves the magnetic performance and the R/W performance in a perpendicular magnetic recording medium, even with a thin ruthenium intermediate layer.

SNR can be attributed to the minimization of crystal grain size and the reduction of variance of alignment. As described above, noise reduction, SNR improvement, and enhancement of recording density have been achieved without impairing thermal stability in a perpendicular magnetic recording medium. The thickness reduction of a nonmagnetic intermediate layer has also achieved, resulting in improvement of write performance and in cost reduction.

Next, an effect of additive elements to the soft magnetic underlayer of CoNiFe is discussed comparing Example 1 with Examples 2-4. While the elements contained in the underlayer are only Co, Ni, and Fe in Example 1, Si is added in Example 2, B is added in Example 3, and Nb and B are added in Example 4. Comparing the Hc value of the underlayer, Examples 2-4 exhibited the Hc values of about ½ to ⅓ of the value in Example 1, indicating improvement in the soft magnetic performance owing to the addition of Si, B, or Nb. The XRD observation detected only an fcc-CoNiFe (111) peak in every underlayer of Examples 1-4.

Comparing the magnetic performance and the R/W performance of the perpendicular magnetic recording media, the perpendicular magnetic recording medium of Examples 2-4 showed increase in Hc by about 5% and improvement in SNR by 0.5 to 0.7 dB as compared with the perpendicular magnetic recording medium of Example 1. The crystal grain sizes in the magnetic recording layer evaluated by the TEM were 6.4 nm, 6.4 nm, and 6.3 nm in the perpendicular magnetic recording media of Examples 2-4, respectively, all of which have about 4% smaller grain size in the perpendicular magnetic recording medium than that of Example 1.

The values of the squareness ratio were approximately 1 within measurement error in the perpendicular magnetic recording media of Examples 2-4, showing no problem in thermal stability. As described above, it has been demonstrated that the addition of Si, B, or Nb to the underlayer of CoNiFe improves soft magnetic performance of the soft magnetic underlayer of CoNiFe, and further minimizes the crystal grain size and improves media performances.

The effect of a seed layer is discussed comparing Example 5 with Example 1. Example 5 is provided with a tantalum seed layer having thickness of 0.5 nm between a soft magnetic backing layer and a soft magnetic underlayer of CoNiFe, in addition to the layer structure of Example 1. Comparing the Hc of the underlayers, it can be seen that the provision of the tantalum seed layer improves the soft magnetic performance of the underlayer. Comparing the magnetic performance and the R/N performance of the perpendicular magnetic recording media, in the perpendicular magnetic recording medium of Example 5, the Hc was improved by a significant amount of about 11% and the SNR was improved by about 1 dB as compared with the perpendicular magnetic recording medium of Example 1. The crystal grain size in the magnetic recording layer evaluated by the TEM was 6.3 nm in the perpendicular magnetic recording medium of Examples 5, which is about 4% smaller than the grain size in the perpendicular magnetic recording medium of Example 1, as in the perpendicular magnetic recording media of Examples 2-4. The XRD measurement was made on a rocking curve of a Co (002) peak. The measured half width of the rocking curve was 2.9° for the perpendicular magnetic recording medium of Example 5, while the half width of the rocking curve was 3.4° for the perpendicular magnetic recording medium of Examples 1. These results indicate that the improvements in the magnetic performance and the R/W performance resulted from the provision of the tantalum seed layer can be attributed to the contribution of alignment improvement in addition to the miniaturization of the crystal grain size. As described above, it has been demonstrated that the provision of the tantalum seed layer in addition to the soft magnetic underlayer of CoNiFe achieves further minimization of crystal grain size and further improvement in crystal alignment in a magnetic recording layer, enhancing media performances.

Next, an effect of difference in soft magnetic backing layers is discussed comparing the Example 5 and Example 6. Example 6 has a soft magnetic backing layer of FeCoB composed of fine crystals having a bcc structure. As apparent in Table 1, the magnetic performances and the R/W performances of Example 5 and Example 6 are approximately equal within the measurement error. These results indicate that the change of a soft magnetic backing layer from amorphous CoZrNb to crystalline FeCoB does not affect the magnetic performance and the R/W performance. Both examples provide approximately equivalent performances.

The influence of the crystal structure of the soft magnetic underlayer of CoNiFe to the media performances is discussed comparing Examples 1-5 with Comparative Example 3. The ratio of Co, Ni, and Fe in the composition of the underlayer is different in Comparative Example 3 from in Examples 1-5. The XRD analysis of the underlayers detected the fcc-CoNiFe (111) peak alone in Examples 1-5, confirming a sole fcc phase. For the composition of Comparative Example 3, on the other hand, a strong peak of bcc-CoNiFe (110) was detected in addition to a weak peak of fcc-CoNiFe (111), confirming a phase of principally bcc. Comparing the magnetic and R/W performances, the Hc is lower by 40% and the SNR is a very low value of about half in the perpendicular magnetic recording medium of Comparative Example 3 as compared with the perpendicular magnetic recording media of Examples 1-5. The XRD measurement on the perpendicular magnetic recording medium of Comparative Example 3 failed to detect any clear peak such as Co (002) peak of the magnetic recording layer, which indicates extremely disordered c-axis alignment in the magnetic recording layer of the perpendicular magnetic recording medium of Comparative Example 3. The disordered alignment is also significant in the squareness ratio, which is a low value of 0.75 in Comparative Example 3. The decrease of the squareness ratio means degradation of thermal stability. Thus, the perpendicular magnetic recording medium of Example 3 is a perpendicular magnetic recording medium of low thermal stability. As described above, it has been demonstrated that an underlayer containing Co, Ni, and Fe but not having an fcc structure exhibits disordered alignment in the magnetic recording layer and significantly deteriorates magnetic performances and electromagnetic conversion performances of the medium.

Next, the influence of the soft magnetic performance of the soft magnetic underlayer of CoNiFe on the media performances is discussed comparing Comparative Example 4 with Examples 1-5. Comparative Example 4 differs from Examples 1-5 in that Comparative Example 4 uses an underlayer consisting of Co, Ni, Fe and an additive of carbon. The Hc value of the underlayer in Comparative Example 4 is 17.51 kA/m, which is one to two orders of magnitude higher than those in Examples 1-5. VSM measurement confirmed the existence of plenty of perpendicular component of magnetization in the underlayer of Comparative Example 4. Comparing the magnetic and R/W performances, however, the Hc value is lower by more than 15% and the SNR is lower by about 3 dB in the perpendicular magnetic recording medium of Comparative Example 4 than in the perpendicular magnetic recording media of Examples 1-5. The rocking curve of the Co (002) peak of the magnetic recording layer obtained by XRD measurement indicated a half width of a large value of 9.8° for the perpendicular magnetic recording medium of Comparative Example 4, which confirms disordered c-axis alignment in the magnetic recording layer. In addition, the R/W measurement revealed the increase of low frequency noise in the perpendicular magnetic recording medium of Comparative Example 4. The measured increment of the noise is so-called white noise, and the increment of the white noise is almost specified to be caused by the underlayer. As described above, it has been demonstrated that an additive element of carbon degrades the crystal alignment, and an underlayer exhibiting high Hc (that is, degraded soft magnetic performance) like in Comparative Example 4 increases noise and lowers the SNR in a perpendicular magnetic recording medium.

Next, the difference in characteristics is discussed between the case of an underlayer of CoFe, which is an underlayer of other than CoNiFe, and the case of a soft magnetic underlayer of CoNiFe according to the invention, comparing Comparative Example 5 with Examples 1-5. Comparing the magnetic performance and the R/W performance in Comparative Example 5 with those in Examples 1-5 shown in Table 1, the Hc is lower by about 50%, the SNR is lower by 7 to 8 dB, showing significant degradation in both the magnetic performance and the R/W performance, in Comparative Example 5 as compared with Examples 1-5. To investigate the reason for this fact, XRD measurement was conducted on the sample having a CoFe underlayer alone deposited on a glass substrate. The peaks observed in the measurement were very weak peaks of hcp (100), hcp (002), hcp (101), and an intense peak of fcc (111) peak. The results indicated that the crystal structure of the CoFe underlayer is mostly an fcc structure. Both of the soft magnetic underlayer of CoNiFe employed in Examples 1-5 and the underlayer of CoFe employed in Comparative Example 5 have the fcc structure. Nevertheless, the performances are noticeably different. A planar TEM observation was conducted on the perpendicular magnetic recording medium of Comparative Example 5 and compared with the microstructure of the perpendicular magnetic recording media of Examples 1-5. The TEM observation indicated a crystal grain size of 6 nm for the perpendicular magnetic recording medium of Comparative Example 5, which is approximately equal to those of the perpendicular magnetic recording media of Examples 1-5. However, in the perpendicular magnetic recording medium of Comparative Example 5, isolation between the crystal grains was poor and the crystal grains were observed connecting at numerous locations. It can be considered that in the perpendicular magnetic recording medium of Comparative Example 5, because the crystal grains are magnetically connecting at numerous locations despite minute grain size, the magnetic cluster size are enlarged, deteriorating the noise and SNR performances.

A perpendicular magnetic recording medium according to the present invention can exhibit improved magnetic performance and electromagnetic conversion performance by reducing the thickness of a nonmagnetic layer disposed between a soft magnetic layer, such as a soft magnetic backing layer, and a magnetic recording layer. The thickness reduction is compatible with the decrease of variance of the alignment and the grain size of the magnetic crystal grains composing the magnetic recording layer.

For a magnetic thin film to exhibit soft magnetic property, magnetic crystal grains generally need to be magnetically bound together strongly. As a result, a soft magnetic film is liable to have a structure of continuous film with an obscure grain boundary. On the other hand, crystal grains of an underlayer must be isolated by a clear grain boundary to control grain size of the magnetic recording layer according to the grain size of the underlayer and to promote magnetic isolation between crystal grains of the magnetic recording layer. Thus, a film structure required to provide a soft magnetic property conflicts with a film structure required by an underlayer for a magnetic recording layer. Therefore, use of a soft magnetic film for an underlayer has been difficult. Nevertheless, the present inventors have made extensive studies and found that an underlayer exhibiting soft magnetic property and isolated by clear grain boundaries can be obtained by using a soft magnetic material containing cobalt, nickel, and iron and having an fcc structure.

A nonmagnetic intermediate layer is disposed between the underlayer and the magnetic recording layer to intercept the magnetic interaction between the magnetic recording layer and the underlayer having soft magnetic property. The nonmagnetic intermediate layer exhibits satisfactory crystallinity even in a thin film by selecting a material that performs favorable epitaxial growth from the underlayer. Thus, the nonmagnetic intermediate layer can be made thin. By this manner, it can be achieved to reduce the thickness of a nonmagnetic layer disposed between a soft magnetic layer including a soft magnetic backing layer and a magnetic recording layer, while this thickness reduction is compatible with the decrease of variance of the alignment and the grain size of the magnetic crystal grains, promoting magnetic isolation between the crystal grains in the magnetic recording layer.

A perpendicular magnetic recording medium having the structure as described above decreases the grain size of magnetic crystal grains and the variance of alignment of a magnetic recording layer, and promotes the magnetic isolation between the magnetic crystal grains without expanding the magnetic distance between a magnetic recording head and a layer with a soft magnetic property in the perpendicular magnetic recording medium. Since the magnetic distance between the magnetic recording head and the layer with a soft magnetic property is not expanded, the write performance of the perpendicular magnetic recording medium is improved. Since a sharp recording magnetic field is ensured, the recording resolution of the perpendicular magnetic recording medium is improved. These improvements result in reduction of media noise, SNR improvement, and high recording density. At the same time, cost reduction is also achieved owing to the thickness reduction of the nonmagnetic intermediate layer.

The underlayer and the nonmagnetic intermediate layer attain favorable alignment and crystallinity even by a deposition process without heating. Consequently, a magnetic recording medium can be fabricated without heating in combination with a granular magnetic recording layer, which has magnetic crystal grains dispersed in a matrix of nonmagnetic oxide or nonmagnetic nitride and is suited for a deposition process without heating.

While the present invention has been particularly shown and described with reference to particular examples thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

What is claimed is:

1. A perpendicular magnetic recording medium comprising:
    a soft magnetic backing layer, a seed layer, an underlayer, a nonmagnetic intermediate layer, and a magnetic recording layer sequentially disposed on a nonmagnetic substrate,
    wherein the underlayer consists essentially of cobalt, nickel, iron, and at least one other element selected from a group consisting of Si, B, and Nb,
    wherein the underlayer has an fcc structure and exhibits soft magnetic property,
    wherein the underlayer has crystal grains and grain boundaries that isolate the crystal grains from each other to control grain size of the magnetic recording layer and to promote magnetic isolation between crystal grains of the magnetic recording layer,
    wherein the underlayer contains nickel in a range of 30 at % to 88 at % and iron in a range of 0.1 at % to 22 at %,
    wherein the underlayer has a thickness of at most 30 nm,
    wherein the nonmagnetic intermediate layer contains at least one element selected from a group consisting of Ru, Re, Pd, Ir, Pt, and Rh, and
    wherein the seed layer contains at least one element selected from a group consisting of Ta, Ti, Zr, Cr, Mo, W, Si, Al, Pd, and Pt.

2. The perpendicular magnetic recording medium according to claim 1, wherein the nonmagnetic intermediate layer has a thickness of at most 20 nm.

3. The perpendicular magnetic recording medium according to claim 1, wherein the underlayer exhibits a coercivity of at most 10 kA/m.

4. The perpendicular magnetic recording medium according to claim 1, wherein the seed layer has a thickness of at most 5 nm.

5. The perpendicular magnetic recording medium according to claim 1, wherein the magnetic recording layer has a granular structure in which magnetic crystal grains are dispersed in a matrix of nonmagnetic oxide or nonmagnetic nitride.

6. A method of manufacturing a perpendicular magnetic recording medium comprising the steps of:
providing a nonmagnetic substrate; and
sequentially depositing a soft magnetic backing layer, a seed layer, an underlayer, a nonmagnetic intermediate layer, and a magnetic recording layer on one side of the nonmagnetic substrate,
wherein the underlayer consists essentially of cobalt, nickel, iron, and at least one other element selected from a group consisting of Si, B, and Nb,
wherein the underlayer has an fcc structure and exhibits soft magnetic property,
wherein the underlayer has crystal grains and grain boundaries that isolate the crystal grains from each other to control grain size of the magnetic recording layer and to promote magnetic isolation between crystal grains of the magnetic recording layer, and
wherein the underlayer contains nickel in a range of 30 at % to 88 at % and iron in a range of 0.1 at % to 22 at %,
wherein the underlayer has a thickness of at most 30 nm,
wherein the nonmagnetic intermediate layer contains at least one element selected from a group consisting of Ru, Re, Pd, Ir, Pt, and Rh, and
wherein the seed layer contains at least one element selected from a group consisting of Ta, Ti, Zr, Cr, Mo, W, Si, Al, Pd, and Pt.

7. The method of claim 6, wherein the soft magnetic backing layer, the seed layer, the underlayer, the nonmagnetic intermediate layer, and the magnetic recording layer are deposited without heating.

8. The perpendicular magnetic recording medium according to claim 1, wherein the soft magnetic backing layer is selected from a group consisting of crystalline alloy, Sendust alloy, and amorphous cobalt alloy.

9. The method according to claim 6, wherein the soft magnetic backing layer is selected from a group consisting of crystalline alloy, Sendust alloy, and amorphous cobalt alloy.

* * * * *